US012745744B2

(12) United States Patent
Coady

(10) Patent No.: US 12,745,744 B2
(45) Date of Patent: Sep. 29, 2026

(54) SYSTEMS AND METHODS FOR ENCOURAGING MOVEMENT OF POULTRY WITHIN A MOBILE POULTRY ENCLOSURE

(71) Applicant: Perdue Foods LLC, Salisbury, MD (US)

(72) Inventor: Daniel J. Coady, Warner Springs, CA (US)

(73) Assignee: PERDUE FOODS LLC, Salisbury, MD (US)

( * ) Notice: Subject to any disclaimer, the term of this patent is extended or adjusted under 35 U.S.C. 154(b) by 0 days.

(21) Appl. No.: 17/495,763

(22) Filed: Oct. 6, 2021

(65) Prior Publication Data

US 2023/0104291 A1 Apr. 6, 2023

(51) Int. Cl.
*A01K 31/00* (2006.01)
*A01K 1/00* (2006.01)
*A01K 31/22* (2006.01)

(52) U.S. Cl.
CPC ................ *A01K 1/00* (2013.01); *A01K 31/00* (2013.01); *A01K 31/22* (2013.01)

(58) Field of Classification Search
CPC ................................ A01K 31/00; A01K 31/22
USPC ................................ 119/481, 712, 713, 719
See application file for complete search history.

(56) References Cited

U.S. PATENT DOCUMENTS 4,109,605 A * 8/1978 Bachli .................. A01M 29/06 116/22 A
4,167,153 A * 9/1979 Markum .............. A01K 15/003 119/51.01
4,304,194 A * 12/1981 Boykin, II ........... A01K 1/0029 119/51.04
4,313,397 A * 2/1982 Markum .............. A01K 15/003 119/51.02
4,341,181 A * 7/1982 Fair .......................... A01K 3/00 119/512
5,076,212 A * 12/1991 Thompson ........... A01K 15/003 119/51.01
5,956,880 A * 9/1999 Sugimoto ............ A01M 29/06 116/22 A
6,487,988 B1 * 12/2002 Good .................. A01K 15/003 119/713
6,807,765 B2 * 10/2004 Watermann ........... A01M 29/06 43/2

(Continued)

OTHER PUBLICATIONS

International Search Report and Written Opinion for Application No. PCT/US2022/045926, mailed on Jan. 9, 2023, 8 pages.

(Continued)

*Primary Examiner* — David J Parsley
(74) *Attorney, Agent, or Firm* — Esplin & Associates, PC

(57) ABSTRACT

A system for encouraging movement of poultry disposed within a mobile poultry enclosure. The system may include one or more movable visual cues and/or auditory cues. The one or more visual cues may be disposed along a wall of a mobile poultry enclosure. The system may include a movement mechanism coupled to the one or more movable visual cues. The movement mechanism may cause the one or more movable visual cues to move to encourage the poultry within the enclosure to move away from the one or more movable visual cues. The system may include an actuator that initiates the movement mechanism causing the one or more movable visual cues and/or auditory cues to move.

21 Claims, 6 Drawing Sheets

(56) References Cited

U.S. PATENT DOCUMENTS

| | | | | |
|---|---|---|---|---|
| 7,654,217 | B2 * | 2/2010 | Sullivan | A01M 29/06 116/22 A |
| 11,026,406 | B2 * | 6/2021 | Planquette | A01K 1/0029 |
| 2019/0110430 | A1 * | 4/2019 | Badiou | A01K 1/0035 |
| 2021/0092934 | A1 * | 4/2021 | Greive | A01K 1/105 |
| 2021/0274748 | A1 | 9/2021 | Massie et al. | |

OTHER PUBLICATIONS

International Preliminary Report on Patentability for Application No. PCT/US2022/045926, mailed on Apr. 18, 2024, 6 pages.

Extended European Search Report for Application No. 22879299.0, mailed on Jul. 22, 2025.

* cited by examiner

SYSTEMS AND METHODS FOR ENCOURAGING MOVEMENT OF POULTRY WITHIN A MOBILE POULTRY ENCLOSURE

FIELD

The disclosure relates to systems and methods for encouraging movement of poultry within a mobile poultry enclosure.

BACKGROUND

Existing methods of pasture raising poultry and/or swine are expensive for both farmers and consumers and thus are typically limited to small scale production. The amount of land and labor required to manage a large quantity of grazing poultry and/or swine has typically prevented pasture raised poultry and/or swine from being scalable for commercial poultry and/or swine farmers.

Large scale mobile poultry enclosures that house hundreds of birds provide a cost efficient manner of producing pasture raised poultry on a commercial scale. These mobile poultry enclosures may be 150-300 feet in length and 30-75 feet wide. Moving such a large, floorless structure with hundreds of birds inside can be difficult as poultry may be reluctant to move (especially at later stages of their growth).

SUMMARY

One aspect of the disclosure relates to systems and methods for encouraging movement of poultry disposed within a mobile poultry enclosure. The system may include one more movable visual cues disposed along a wall of the mobile poultry enclosure. The one or more visual cues may be coupled to the wall via a cable and/or other coupling mechanism. The one or more visual cues may be coupled to the wall at any height (e.g., ground height, a few feet about the ground, and/or higher) to similar ground and/or aerial predators. Livestock and poultry specifically, are keenly aware to ground and aerial predators. For this reason, moving objects at ground level or above initiate their instinctive flight response. The one or more visual cues may move prior to and/or during the movement of the mobile poultry enclosure to encourage the birds within the coop to move in the direction the poultry coop is moving. A visual cue may comprise a flag, poster, ribbon, banner, dangle, tassel, light, brush, and/or or other visual object that could cause a bird to move in response to the object moving.

The system may include a movement mechanism that causes the one or more visual cues to move. The movement mechanism may be coupled to the one or more movable visual cues. In some implementations, the movement mechanism may cause the one or more movable visual cues to move in a random or repetitive manner. The movement of the one or more visual cues may encourage the poultry within the enclosure to move away from the one or more movable visual cues. The poultry may move in the same direction as the movement of the enclosure and/or away from the back wall of the enclosure so it can move without running over the poultry.

In some implementations, the movement mechanism may include a motor. The motor may be configured to rotate an arm coupled to a rotating shaft of the motor. The rotating arm may cause the one or more visual cues to move via one or more cables coupled to the rotating arm. In some implementations, the movement mechanism may move in a repetitive manner, causing the one or more movable visual cues to move in a repetitive or random manner. By way of non-limiting example, one or more cables may be coupled to the rotating arm at a point off-center to the rotating shaft. Continuing the non-limiting use example, responsive to the shaft rotating causing the arm to rotate, the cables will move and cause the visual cues to oscillate.

The system may include an actuator that initiates the movement mechanism causing the one or more movable visual cues to move. In some implementations, the actuator may be programmable such that the motor may be initiated automatically based on a programmed schedule. In some implementations, the actuator may comprise a switch that is manually turned on to initiate the motor causing movement of the visual cues. In some implementations, the actuator may initiate the movement mechanism responsive to sensor input. For example, the sensor input may indicate it is time for the mobile poultry enclosure to move and/or there are poultry birds too close to the back wall of the enclosure. By way of non-limiting example, the actuator may be configured to initiate the movement mechanism prior to and/or during movement of the mobile poultry enclosure.

In some implementations, the mobile poultry enclosure may be at least 90 feet in length and/or at least 25 feet wide. Continuing the non-limiting use example, the one or more movable visual cues may be disposed along a back wall of the moveable poultry enclosure. The back wall may be designated as such relative to a direction of movement of the mobile poultry enclosure such that the back wall is furthest from the direction of movement of the mobile poultry enclosure. As such, when the poultry enclosure moves, the poultry need to be encouraged away from the trailing wall of the enclosure so they do not physically encounter the flexible barrier disposed on the lower portion of the back wall. In some implementations, the one or more movable visual cues may be disposed along a back wall of the moveable poultry enclosure and a front wall of the moveable poultry enclosure relative to a direction of movement of the mobile poultry enclosure. As such, when the moveable poultry enclosure reaches the end of a field and has to go back the opposite direction, the front wall becomes the back wall. In other implementations, the system for encouraging movement of the poultry is removably coupled to the back wall of the mobile poultry enclosure such that it can be switched when the direction of the enclosure is changed.

The one or more movable visual cues may be disposed along the back wall of the mobile poultry enclosure via one or more cables. The one or more cables may be coupled to the motor arm and/or extend to one or more side walls (and/or the backwall near the side wall). The one or more cables may be coupled to the one or more side walls (and/or the back wall near the one or more side walls) via a coupling mechanism. By way of non-limiting example, the coupling mechanism may comprise one or more flexible anchor linkages. In some implementations, the flexible anchor linkages may include one or more springs, bungee, natural cord stretch, and/or other flexible anchor linkages. As such, when the motor rotates the shaft thereby rotating the arm, the cables can move back and forth without detaching and/or breaking.

These and other objects, features, and characteristics of the disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of “a”, “an”, and “the” include plural referents unless the context clearly dictates otherwise. As used in the specification and in the claims, the distinctions “first”, “second”, and/or “third” are used for clarity and distinction purposes and do not indicate order unless the context clearly dictates otherwise.

DETAILED DESCRIPTION

Figure 1:
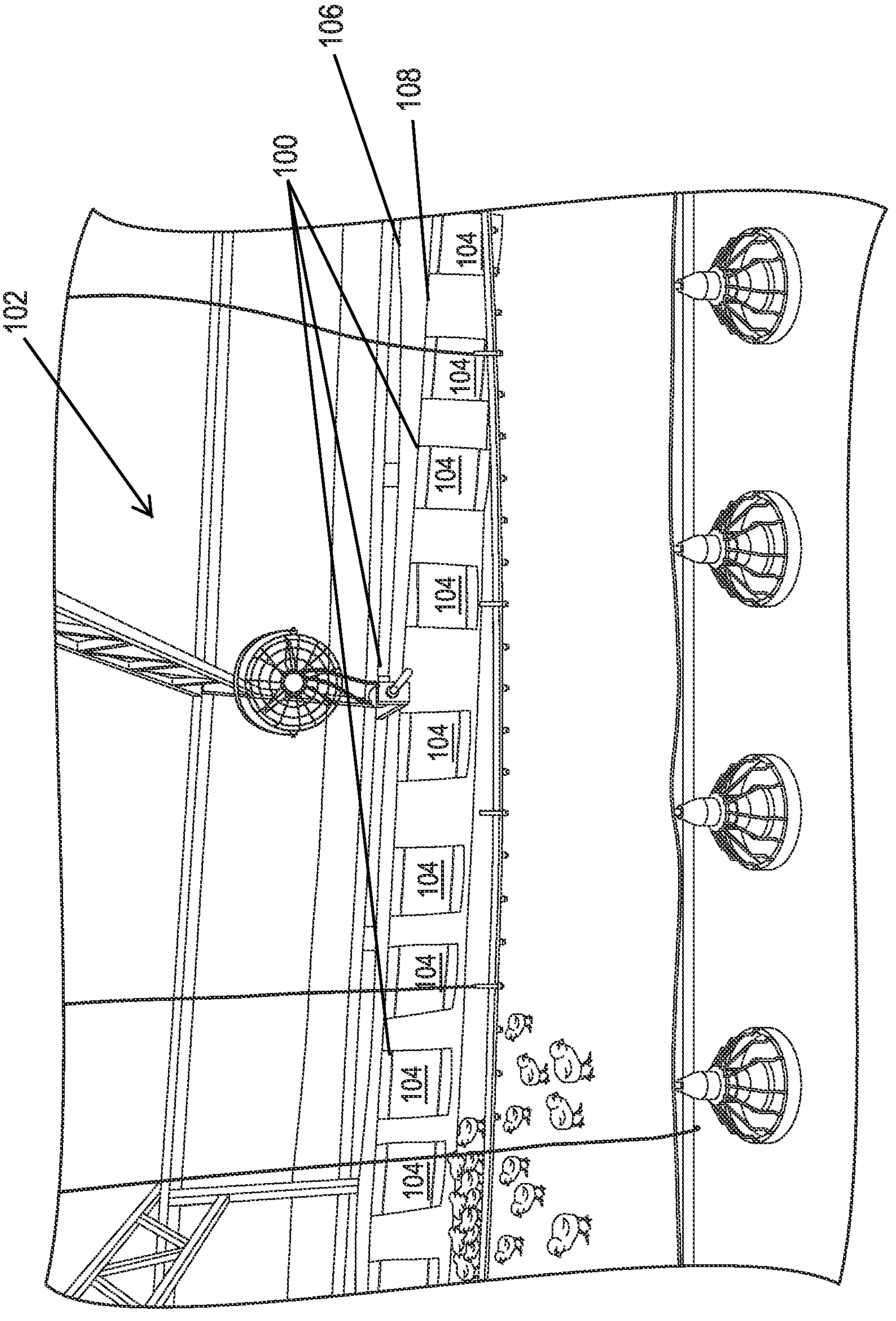
FIG. 1 illustrates a system for encouraging movement of poultry disposed within a mobile poultry enclosure coupled to an end wall of a mobile poultry enclosure, in accordance with one or more implementations.

FIG. 1 illustrates a system for encouraging movement of poultry disposed within a mobile poultry enclosure coupled to an end wall of a mobile poultry enclosure, in accordance with one or more implementations. The system 100 for encouraging movement of poultry disposed within a mobile poultry enclosure 102 may include one or more movable visual cues 104. The movable visual cues 104 may be disposed along a wall (e.g., back wall 106) of the mobile poultry enclosure. The one or more visual cues 104 may be coupled to a wall (e.g., back wall 106 and/or an end wall) via one or more cables (e.g., cable 108), rope, wire, flexible anchor linkages, and/or other coupling mechanisms for coupling the cable(s), rope(s), and/or wire(s) to the wall. For example, coupling mechanism may include one or more springs, bungee, natural cord stretch, and/or other flexible anchor linkages. The one or more visual cues may be coupled to the wall at any height (e.g., ground height, a few feet about the ground, and/or higher) to simulate ground and/or aerial predators.

The one or more visual cues 104 may start moving prior to and/or during the movement of mobile poultry enclosure 102 to encourage the birds 108 within the enclosure to move away from end wall 106. The movement of the one or more visual cues 104 may be repetitive or random. In some implementations, visual cues 104 may oscillate and/or shake. Poultry birds do not like the moving visual cues 104 so they move away from them. In some implementations, the birds 108 may move away from back wall 106 due to visual cues 104 moving so mobile poultry enclosure can move.

A visual cue (such as visual cues 104) may comprise a flag, poster, ribbon, banner, dangle, tassel, light, brush, and/or or other visual that could cause a bird to move in response to the visual moving. The system may include one or more auditory cues 110 in addition to visual cues 104. The one or more auditory cues 110 may include bells, metal pieces, cans, shakers, and/or items that make noise when shaken or moved.

Figure 2:
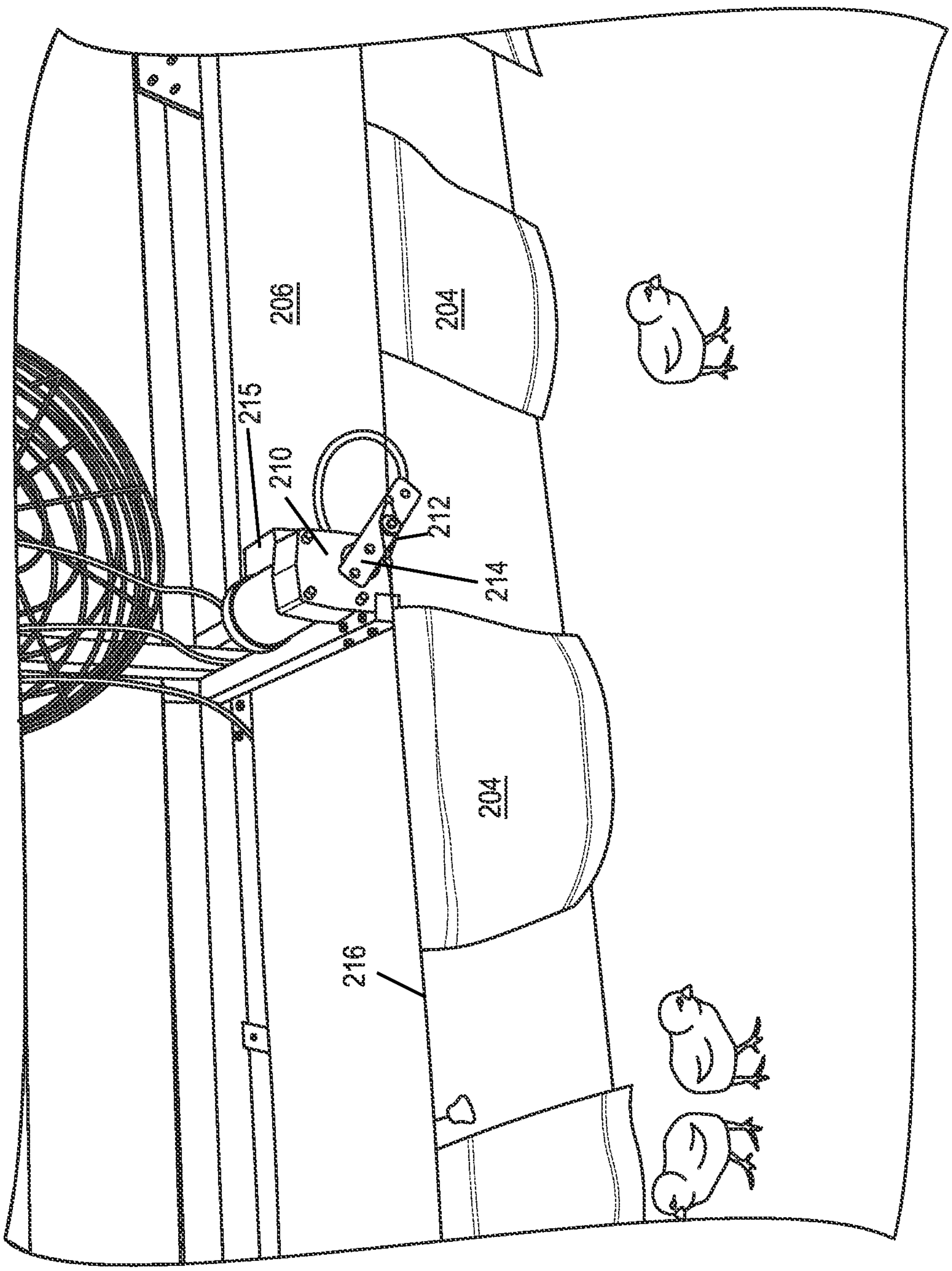
FIG. 2 illustrates a visual cue coupled to a cable located at or near an back wall of a mobile poultry enclosure, in accordance with one or more implementations.

FIG. 2 illustrates an example movement mechanism, in accordance with one or more implementations. Movement mechanism 200 may cause the one or more visual cues to move, shake, and/or oscillate. Movement mechanism 200 may be coupled to the one or more movable visual cues 204. In some implementations, movement mechanism 204 may move in a repetitive manner causing one or more movable visual cues 204 to move in a random or repetitive manner. The movement of visual cues 204 may encourage the poultry within mobile poultry enclosure 202 to move away from movable visual cues 204. The poultry may move in the same direction as the movement of mobile poultry enclosure 202 and/or away from back wall 206 of mobile poultry enclosure 202 so it can move without the poultry birds coming into contact with the back wall. Livestock and poultry specifically, are keenly aware to ground and aerial predators. For this reason, moving objects at ground level or above initiate their instinctive flight response.

In some implementations, movement mechanism 200 may include a motor 210.

Motor 210 may be configured to rotate arm 212 coupled to rotating shaft 214 of the motor 210. Rotating arm 212 may cause visual cues 204 to move via cables 216 coupled to rotating arm 212. When rotating arm 212 rotates, cables 216 move up and down and/or back and forth causing visual cues 204 (coupled to cables 216) to oscillate. In one non-limiting example, cables 216 may be coupled to rotating arm 212 at a point off-center to the rotating shaft. Continuing the non-limiting use example, responsive to the shaft rotating causing the arm to rotate, the cables will move up and down as well as side to side, causing visual cues 204 to oscillate. Other types of movement are contemplated and would provide the same effect as the non-limiting examples set forth herein.

In some implementations, movement mechanism may utilize the excess power delivered via a drive system of mobile poultry enclosure 202. As such, motor 210 may be the same motor that powers movement of mobile poultry enclosure 202 across the ground.

In some implementations, the system may include an actuator that initiates the movement mechanism causing the one or more movable visual cues to move. Actuator 215 may be programmable such that motor 210 may be initiated automatically based on a programmed schedule. In some implementations, actuator 215 may comprise a switch that is manually turned on to initiate motor 210 causing movement of the visual cues. In some implementations, the actuator may initiate movement mechanism 200 responsive to sensor input. By way of non-limiting example, actuator 215 may be configured to initiate movement mechanism prior to and/or during movement of the mobile poultry enclosure.

In some implementations, movement mechanism 210 may capitalize on excess power delivered via the drive system of mobile poultry enclosure 202 such that movement mechanism is ground actuated.

Figure 3:
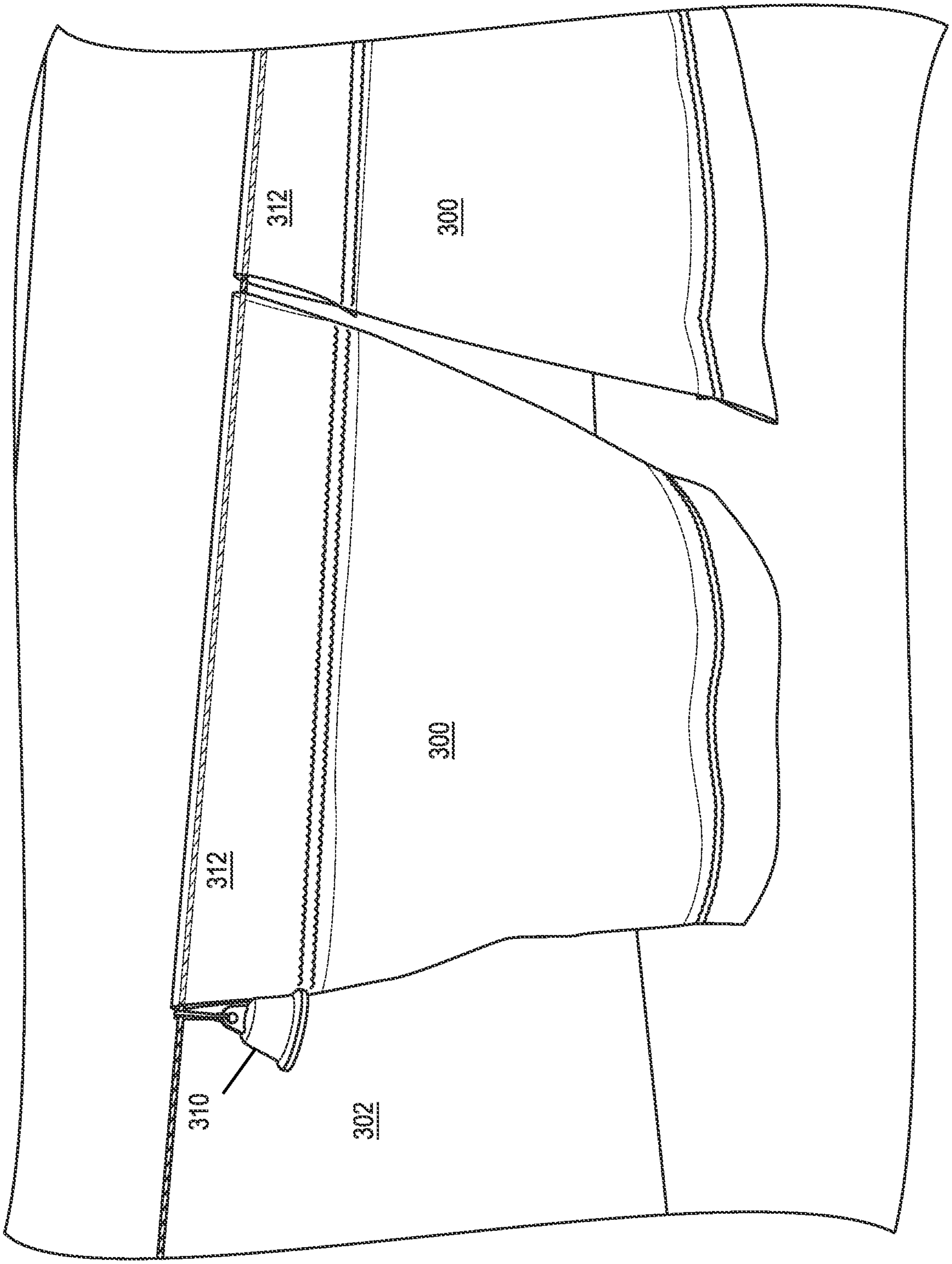
FIG. 3 illustrates an example movement mechanism, in accordance with one or more implementations.

FIG. 3 illustrates a visual cue coupled to a cable located at or near a back wall of a mobile poultry enclosure, in accordance with one or more implementations. Visual cue 300 may comprise a polyethylene flag and/or another flag made of a durable material. For example, visual cue 300 may be plastic, canvas, coated fabric, and/or another durable material. Visual cue 300 may be coupled to back wall 304 via cable 308. Visual cue 300 may include a pocket 312 through which cable 308 may be threaded thereby causing visual cue 300 to hang. Visual cue 300 may be any shape such as, for example, rectangular, square, triangular, etc. Visual cue(s) 300 may comprise one or more of a flag, poster, ribbon, banner, dangle, tassel, light, brush, object, and/or or other visual that could cause a bird to move in response to visual cue 300 moving. By way of non-limiting example, visual cue 300 could include a horizontal rotating brush coupled to mobile poultry enclosure 302 via structural elements.

The system may include one or more auditory cues 310 in addition to visual cues 300. The one or more auditory cues may use sound to encourage the poultry birds to move away from the back wall. By way of example, auditory cues 310 may include bells, metal pieces, cans, shakers, and/or items that make noise when shaken or moved.

Figure 4:
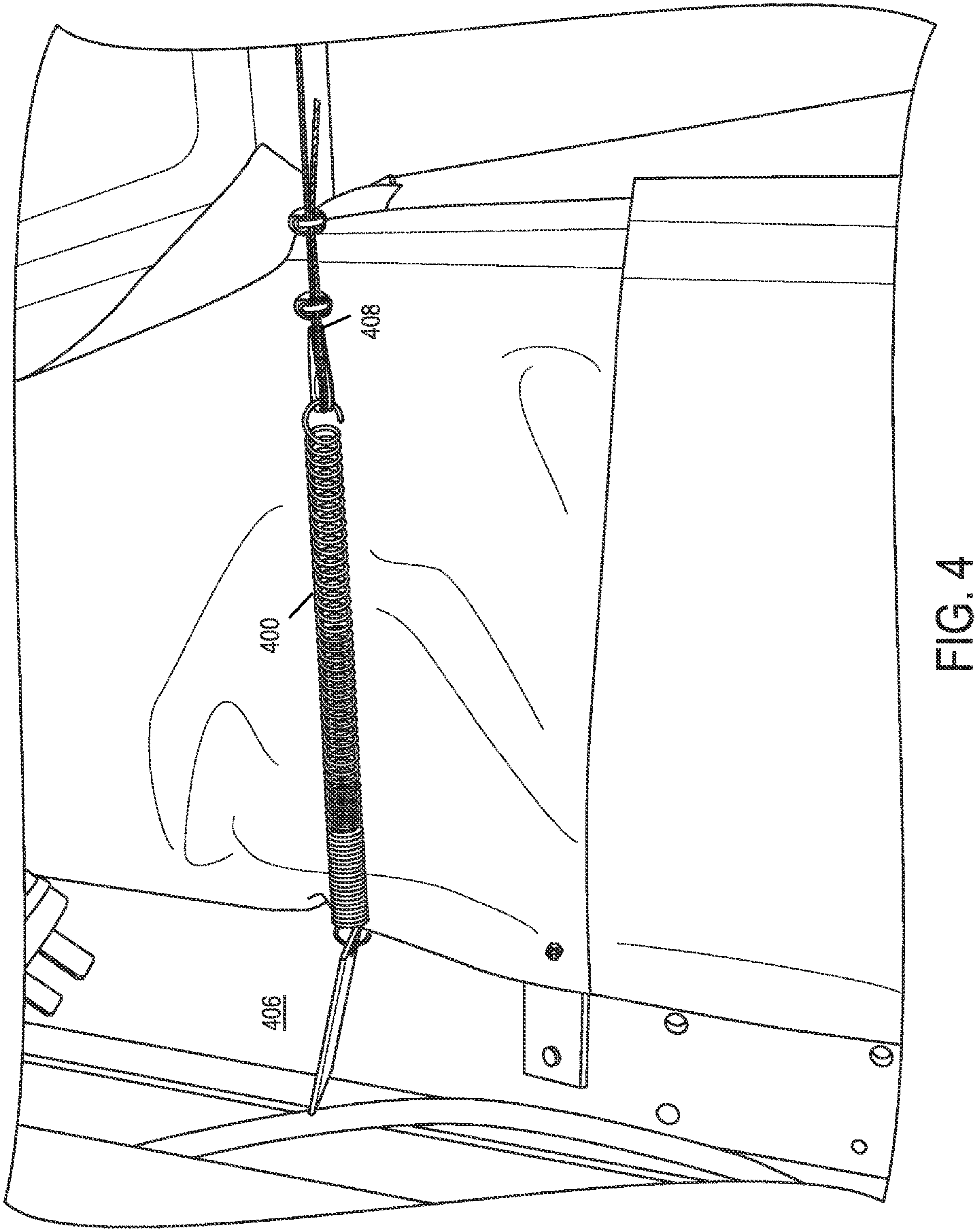
FIG. 4 illustrates an example coupling mechanism for coupling a cable to a back wall and/or side wall of the mobile poultry enclosure, in accordance with one or more implementations.

FIG. 4 illustrates an example coupling mechanism for coupling a cable to an end wall and/or side wall of the mobile poultry enclosure, in accordance with one or more implementations. Coupling mechanism 400 may couple cables 408 to back wall 406 and/or end wall of mobile poultry enclosure 402. For example, cables 408 may be coupled to the motor arm and/or extend to one or more side walls (and/or back wall 406 near the corner where back wall 406 meets a side wall for a rectangular shaped enclosure). Cables 408 may be coupled to the one or more side walls (and/or the back wall 406 near the corner where back wall 406 meets a side wall for a rectangular shaped enclosure) via coupling mechanism 400. By way of non-limiting example, coupling mechanism 400 may comprise a flexible anchor linkage. For example, coupling mechanism may include one or more springs, bungee, natural cord stretch, and/or other flexible anchor linkages. As such, when the motor rotates the shaft thereby rotating the arm, the cables can move back and forth without detaching and/or breaking because coupling mechanism 400 may be stretched and/or return to its original shape when pulled and/or pressed respectively. In another embodiment, a flexible and/or stretchable material may be used for coupling mechanism 400 such as rugger, elastic, and/or other material.

Figure 5:
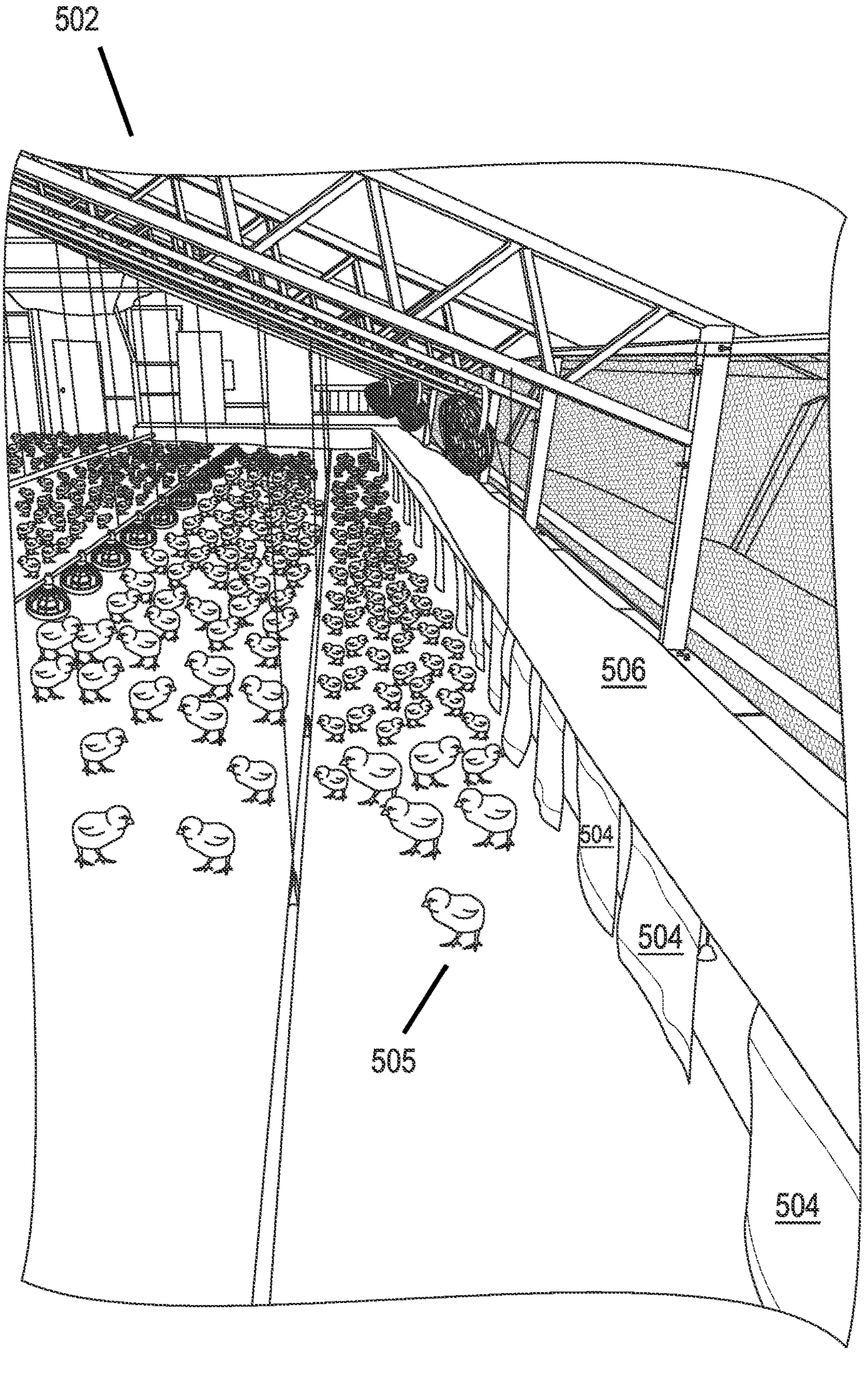
FIG. 5 illustrates a system for encouraging movement of poultry disposed within a mobile poultry enclosure coupled to an end wall of a mobile poultry enclosure, in accordance with one or more implementations.

FIG. 5 illustrates a system for encouraging movement of poultry disposed within a mobile poultry enclosure coupled to an end wall of a mobile poultry enclosure, in accordance with one or more implementations. Mobile poultry enclosure 502 may be at least 90 feet in length and/or at least 25 feet wide. In some implementations, mobile poultry enclosure 502 may be any shape such as a rectangle, square, polygon, pie shape, and/or other shape. At least one side of mobile poultry enclosure 502 may be at least 90 feet in length. Mobile poultry enclosure 502 may be able to house hundreds of birds and move them to fresh pasture daily (and/or weekly, multiple times a day, etc.). System 500 including movable visual cues 504 may be disposed along back wall 506 of mobile poultry enclosure 502. Back wall 506 may be designated as such relative to a direction of movement of mobile poultry enclosure 502. Back wall 506 may be furthest from the direction of movement of mobile poultry enclosure 502. As such, when mobile poultry enclosure 502 moves, poultry 505 are encouraged to move away from back wall 504 so they avoid physical contact with a flexible barrier disposed on the lower portion of back wall 504. In some implementations, movable visual cues 504 may be disposed along and/or near at least part of back wall 504 of mobile poultry enclosure 502. In some implementations, movable visual cues 504 may be disposed along and/or near at least part of back wall 504 and a front wall of the moveable poultry enclosure relative to a direction of movement of mobile poultry enclosure 502. As such, when the moveable poultry enclosure reaches the end of a field and has to go back the opposite direction, the front wall may become the back wall and poultry 505 may be encouraged to move away from it by system 500. In other implementations, system 500 may be removably coupled to back wall 504 such that it can be switched to another wall (which will become the back wall) when the direction of the enclosure is changed.

Figure 6:
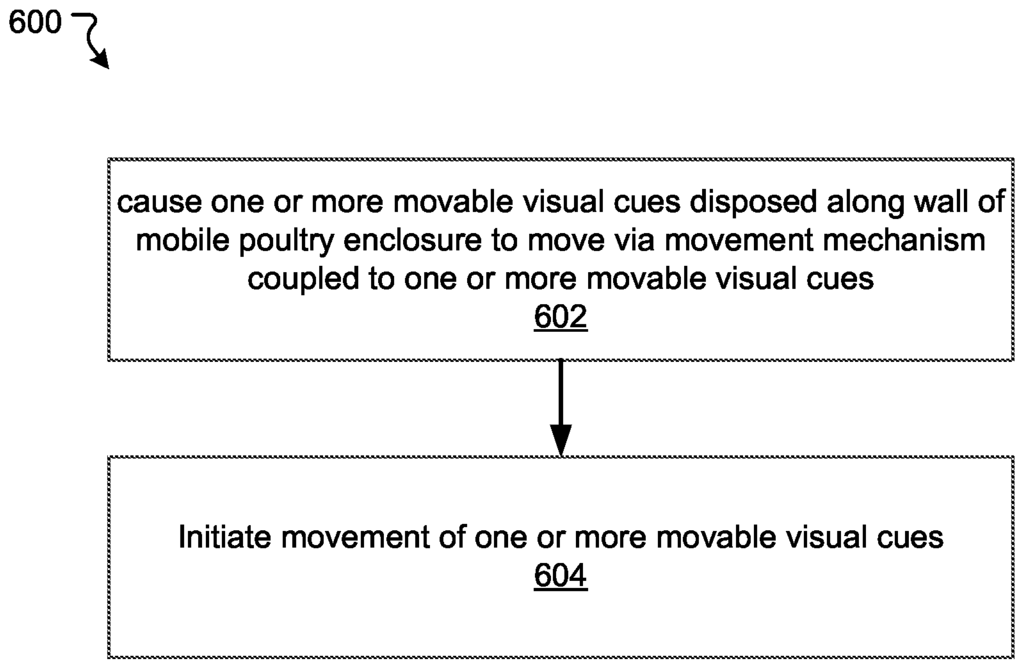
FIG. 6 illustrates a method for encouraging movement of poultry disposed within a mobile poultry enclosure coupled to an end wall of a mobile poultry enclosure, in accordance with one or more implementations.

FIG. 6 illustrates a method for encouraging movement of poultry disposed within a mobile poultry enclosure. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below are not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

Method 600 may include a method for encouraging movement of poultry disposed within a mobile poultry enclosure. The method may be implemented by a movement mechanism and/or actuator within a mobile poultry enclosure.

At operation 602, one or more movable visual cues may be moved via a movement mechanism. The one or more movable visual cues may be disposed along a wall of the mobile poultry enclosure. Operation 602 may be performed by a movement mechanism that is the same as or similar to movement mechanism 200 (see e.g., FIG. 2).

At operation 604, movement of the one or more movable visual cues may be initiated. The movement of the one or more movable visual cues may be actuated via an actuator. The one or more movable visual cues may move in a repetitive and/or random manner. Operation 604 may be performed by a movement mechanism that is the same as or similar to movement mechanism 214 (see e.g., FIG. 2).

In some implementations, the movement mechanism comprises a motor, an arm coupled to a rotating shaft of the motor, and/or one or more cables coupled to the arm.

The systems and/or methods described herein may also be used for a mobile swine enclosure. Such a use is contemplated such that the visual cues may encourage swine to move away from the back wall of an enclosure. Additionally, swine may utilize a shock wire with a visual and/or auditory cue. Once conditioned to the sound they may move to avoid the wire.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for encouraging movement of poultry disposed within a mobile poultry enclosure, the system comprising:

a first set of movable visual cues disposed along a first wall of the mobile poultry enclosure, wherein the mobile poultry enclosure is at least 90 feet in length and the first wall is a back wall of the mobile poultry enclosure relative to a first direction of movement of the mobile poultry enclosure;

a second set of movable visual cues disposed along a second wall of the mobile poultry enclosure which is an alternative back wall of the mobile poultry enclosure relative to a second direction of movement of the mobile poultry enclosure;

a first movement mechanism coupled to the first set of movable visual cues, the first movement mechanism causing the first set of movable visual cues to move during movement of the mobile poultry enclosure to encourage the poultry within the mobile poultry enclosure to move away from the back wall and the first set of movable visual cues in the first direction of movement of the mobile poultry enclosure;

a second movement mechanism coupled to the second set of movable visual cues, the second movement mechanism causing the second set of movable visual cues to move during movement of the mobile poultry enclosure to encourage the poultry within the mobile poultry enclosure to move away from the alternative back wall and the second set of movable visual cues in the second direction of movement of the mobile poultry enclosure; and an actuator that initiates the first movement mechanism and/or the second movement mechanism causing the first set of movable visual cues or the second set of movable visual cues to move, wherein the actuator is configured to initiate the first movement mechanism and/or the second movement mechanism prior to and/or during movement of the mobile poultry enclosure such that responsive to initiation of the first movement mechanism, the first set of movable visual cues moves while the second set does not causing and the poultry to move away from the back wall of the mobile poultry enclosure, and responsive to initiation of the second movement mechanism, the second set of movable visual cues moves while the first set does not causing the poultry to move away from the alternative back wall of the mobile poultry enclosure.

2. The system of claim 1, wherein the first movement mechanism and/or the second movement mechanism moves repetitively causing the first set of movable visual cues and/or the second set of movable visual cues to move in a random manner.

3. The system of claim 1, wherein the first movement mechanism and/or the second movement mechanism comprises a motor.

4. The system of claim 3, wherein the first movement mechanism and/or the second movement mechanism further comprises:

an arm coupled to a rotating shaft of the motor; and one or more cables coupled to the arm.

5. The system of claim 4, wherein the one or more cables are coupled to one or more walls of the poultry enclosure.

6. The system of claim 4, wherein the one or more cables are coupled to one or more walls of the poultry enclosure via one or more flexible anchor linkages.

7. The system of claim 1, wherein the mobile poultry enclosure is a floorless mobile poultry enclosure at least 90 feet in length and at least 25 feet wide.

8. The system of claim 1, wherein the actuator is configured to initiate the first movement mechanism and/or the second movement mechanism during movement of the mobile poultry enclosure.

9. The system of claim 1, wherein the first set of movable visual cues and/or the second set of movable visual cues comprise multiple flags, posters, ribbons, banners, dangles, tassels, lights, and/or brushes.

10. The system of claim 1, further comprising one or more auditory cues.

11. The system of claim 1, wherein the movement mechanism causes the first set of movable visual cues and/or the second set of movable visual cues to oscillate.

12. A method for encouraging movement of poultry disposed within a mobile poultry enclosure, the method comprising:

causing the mobile poultry enclosure to move in a first direction, wherein the mobile poultry enclosure is at least 90 feet in length;

prior to and/or during movement of the mobile poultry enclosure, initiating movement of one or more movable visual cues disposed along a back wall of the mobile poultry enclosure relative to a direction of movement of the mobile poultry enclosure while not initiating movement of one or more movable visual cues disposed along a front wall of the mobile poultry enclosure relative to the direction of movement of the mobile poultry enclosure, wherein initiating movement of the one or more movable visual cues causes the one or more movable visual cues along the back wall to move during movement of the mobile poultry enclosure to encourage the poultry within the enclosure to move away from the back wall and in the first direction the mobile poultry enclosure is moving, wherein the movement of the one or more movable visual cues is caused by a movement mechanism coupled to the one or more movable visual cues.

13. The method of claim 12, wherein the movement mechanism moves repetitively causing the one or more movable visual cues to move in a random manner.

14. The method of claim 12, wherein the movement mechanism comprises a motor.

15. The method of claim 14, wherein the movement mechanism further comprises:

an arm coupled to a rotating shaft of the motor; and one or more cables coupled to the arm.

16. The method of claim 15, wherein the one or more cables are coupled to one or more walls of the poultry enclosure.

17. The method of claim 16 wherein the one or more cables are coupled to one or more walls of the poultry enclosure via one or more flexible anchor linkages.

18. The method of claim 12, wherein the mobile poultry enclosure is a floorless mobile poultry enclosure at least 90 feet in length and at least 25 feet wide.

19. The method of claim 12, wherein the one or more visual cues comprise one or more of a flag, poster, ribbon, banner, dangle, tassel, light, and/or brush.

20. The method of claim 12, further comprising causing one or more auditory cues disposed along the back wall of the mobile poultry enclosure to move via the movement mechanism coupled to the one or more auditory cues.

21. The method of claim 12, wherein the movement mechanism causes the one or more movable visual cues to oscillate.

* * * * *